United States Patent [19]

Hope et al.

[11] 4,384,446
[45] May 24, 1983

[54] LAYING OF OPTICAL WAVEGUIDES ONTO A SUPPORT FILAMENT

[75] Inventors: Tomasz S. Hope; Robert J. Williams, both of Kanata, Canada

[73] Assignee: Northern Telecom Limited, Montreal, Canada

[21] Appl. No.: 275,303

[22] Filed: Jun. 19, 1981

[51] Int. Cl.³ .................. B65H 81/08; D07B 7/14; D07B 1/16

[52] U.S. Cl. .......................... 57/6; 57/18; 57/352; 57/361; 57/293

[58] Field of Search ............ 57/3, 6, 9, 11, 13, 57/17, 18, 264, 293, 311, 352, 361

[56] References Cited

U.S. PATENT DOCUMENTS

| | | | |
|---|---|---|---|
| 4,112,660 | 9/1978 | Ferrentino et al. | 57/352 X |
| 4,154,049 | 5/1979 | King et al. | 57/9 |
| 4,195,468 | 4/1980 | King et al. | 57/352 X |
| 4,205,899 | 6/1980 | King et al. | 57/9 X |
| 4,237,687 | 12/1980 | Vecchis et al. | 57/361 |
| 4,309,864 | 1/1982 | Hulin | 57/6 |
| 4,309,866 | 1/1982 | Fombillida | 57/352 X |
| 4,325,212 | 4/1982 | Hope | 57/9 X |

*Primary Examiner*—Donald Watkins
*Attorney, Agent, or Firm*—R. J. Austin

[57] ABSTRACT

Laying optical waveguides into sinuous grooves of a support filament while holding the grooves in the same position as the filament passes through a waveguide laying station by causing the filament to twist in oscillatory fashion during passage through the station. The grooves are held in the same positions by positionally fixed guide projections located in the grooves. By this laying method, the waveguides themselves are not oscillated around the support filament as they are fed into the laying station. Also, guide elements to feed the waveguides into the grooves extend downstream to a wrapping station whereby tape wrapped around the support filament also is wrapped around the guide elements. The waveguides exit from the guide elements after the tape has been wrapped.

11 Claims, 3 Drawing Figures

LAYING OF OPTICAL WAVEGUIDES ONTO A SUPPORT FILAMENT

This invention relates to the laying of optical waveguides onto a support filament.

Suggestions have been made in the manufacture of optical cable to locate optical waveguides in a grooved support filament. In U.S. Pat. No. 4,205,899, granted June 3, 1980 to F. D. King and T. S. Swiecicki, there is described an optical cable with a grooved support or central filament in which the grooves are helical, i.e. they change hand along the length of the filament. Hence the grooves are sinuous. To manufacture the cable, the filament is extruded by an extrusion unit provided at the die orifice with radially inwardly extending fingers which form the grooves in the filament during extrusion. To introduce the sinuous form to the grooves, a twist unit is located downstream from the extrusion unit and this twist unit oscillates in one direction and then the other direction alternately while holding the filament, thereby causing the filament to twist immediately it leaves the extrusion unit. Waveguides are then located in the grooves by being passed through a reciprocal plate which surrounds the path of the support filament, the waveguides extending along guide fingers or tubes radially inner ends of which are disposed within the grooves. As the filament passes through the reciprocal plate, the plate is caused to rotate by engagement of the fingers within the grooves, the location and path of the grooves dictating the reciprocating motiion of the plate. In other U.S. patents granted to F. D. King and T. S. Swiecicki, namely U.S. Pat. Nos. 4,154,049 and 4,195,468 granted May 15, 1979 and Apr. 1, 1980 respectively, the waveguides are fed into the grooves of the support filament in the same manner as in the U.S. patent just discussed.

It is known in practice that difficulties are caused by the use of the reciprocating plate in that as the waveguides pass through the plate and down into the grooves, they are caused, at the plate position, to rotate around the filament with the plate thereby drawing lengths of filament upstream from the plate radially inwards towards the filament and thus towards contact with the filament. Upon contact with the filament in this position it is known that there is a tendency for the waveguides to be drawn by the filament towards the centre of the plate instead of being fed along their predetermined paths through the plate and down the tubes. Obviously, if this is allowed to happen, it could result in broken or distorted waveguides and stoppage of the machine to disentangle the waveguides from each other and from the support filament. Hence, it is always necessary for an operator to keep a watchful eye on the position of the waveguides as they move towards the reciprocating plate to ensure that the laying in procedure is followed correctly. It would be an advancement in the art, therefore, if some way could be found to avoid the possibility of the above problem arising.

A further problem which arises is caused by the wrapping of the support filament carrying the laid waveguides, with binding tape. After the waveguides are laid, the filament passes through a binding station in which binding tape is wrapped around the filament from a spool surrounding the feed path of the filament. If, as sometimes occurs, the waveguides are more loosely laid into the grooves than is desirable, they may project above the grooves. As the binding tape is wrapped around, it happens that a projecting waveguide is forced by the tape around the adjacent rib formation of the filament to be nipped between tape and filament. Such a poor wrapping operation obviously does not protect the particular waveguide in the desired manner and may deleteriously affect its attenuation properties.

According to the present invention, there is provided a method of laying optical waveguides into grooves of a support filament wherein the grooves extend sinuously along the support filament comprising passing the filament through a waveguide laying station while holding the filament to retain each of its grooves substantially in the same angular position, with respect to a datum, around the longitudinal axis of the filament by providing an oscillatory twist in the filament upstream and downstream of the laying station, the degree of twist dependent upon the sinuous path of the grooves, and laying the filaments into the grooves at the laying station.

The above method is conveniently put into practice by engaging the grooves of the filament, as it passes through the laying station, by groove guide projections which are held in position around the support filament and engage with the grooves. Hence the grooves are forced to pass through the laying station at the position of the projections whereby the filament is caused to twist alternatively in one direction and then the other as defined in the last preceding paragraph.

According to the invention also, apparatus is provided for laying optical waveguides into sinuous grooves of a support filament comprising a laying device disposed around a feed path for the support filament, the device comprising a plurality of elongate guide elements extending inwardly of the feed path to guide waveguides into the grooves, and groove guide projections upstream of the inner end of the guide elements, the guide projections secured in fixed positions, with respect to a datum, around the feed path and extending inwardly to engage within grooves of the filament and hold the grooves in said fixed positions of the guide fingers as the filament passes the guide fingers.

In practice as the support filament moves through the laying device it is twisted to retain the grooves in the fixed positions as dictated by the guide projections. As soon as the support filament has passed the laying device, it commences to untwist so that the grooves immediately move back towards their normal sinuous positions upon the untwisted support filament. Hence, as the support filament moves downstream of the laying device, the grooves immediately commence to wander away from their fixed positions relative to the longitudinal axis of the filament. It follows that the inner ends of the guide elements may need to move over an extremely small angle around the feed path alternately in one direction and then the other to lay the waveguides into the grooves as they start to move back to their normal sinuous positions. This movement may be provided by securing the guide elements to an oscillatory support element disposed around the feed path so that the guide elements follow the slight angular movement of the grooves. This slight angular movement will of course not create any problem with the waveguides upstream of the laying device as there is insufficient oscillatory movement of the waveguides to cause them to move substantially towards the support filament whereby contact between the support filaments and the waveguides upstream of the laying device is completely avoided.

It is preferred, however, to mount the elongate guide elements in fixed positions in the laying device for simplicity of design and operation. Hence, the waveguides will more continuously from the upstream position towards the laying device along fixed paths in which there is no oscillating movement around the support filament imparted to the waveguides. In this particular construction, it is essential that the inner end portions of the guide elements are flexible. This enables them to move one way and then the other in the grooves in which they lie to maintain their positions within the grooves as they commence to move back to their normal sinuous positions upon the filament as this untwists upon leaving the laying device.

In the above method and apparatus, it is desirable for the inner end portions of the guide elements to extend along the grooves beyond a binding tape wrapping station. In this case, the binding tape is caused to be wrapped also around the inner end portions of the guide elements. As the support filament moves along its path from the wrapping station, the wrapped tape moves from the end portions of the guide elements at which point, the waveguides emerge and are placed into the grooves. Hence, upon the waveguides issuing from the guide elements, they are immediately covered by the wrapped tape which has been previously applied. Ideally of course, the inner ends of the guide elements, should be completely within the grooves so as not to be contacted by the wrapped tape. Thus movement of the tape off the guide elements is not resisted by any frictional contact and the wrapped tape does not become loose upon the support filament.

According to a further aspect of the present invention, there is provided a method of laying optical waveguides into grooves of a support filament comprising guiding the waveguides into the grooves by passing them along tubular guide elements which extend radially inwardly and axially of a feed path for the support filament, wrapping the support filament with binding tape in a tape wrapping station, the binding tape being wrapped around the filament and radially inner ends of the guide elements which extend along the feed path as far as the wrapping station and lie completely within the grooves, and continued movement of the support filament along the feed path causing the waveguides to issue from the guide elements after the tape has been wrapped around the filament.

Also, according to yet another aspect of the invention, apparatus is provided for laying optical waveguides into grooves of a support filament comprising a laying device disposed around the feed path for the support filament and a tape wrapping station disposed downstream of the laying device for wrapping binding tape around the filament, the laying device comprising a plurality of tubular guide elements to guide waveguides into the grooves, the tubular guide elements extending along the feed path and having radially inner ends for waveguide exit disposed downstream of the elements, said inner ends extending at least as far as the tape wrapping station.

One embodiment of the invention will now be described by way of example, with reference to the accompanying drawings in which.

Figure 1:
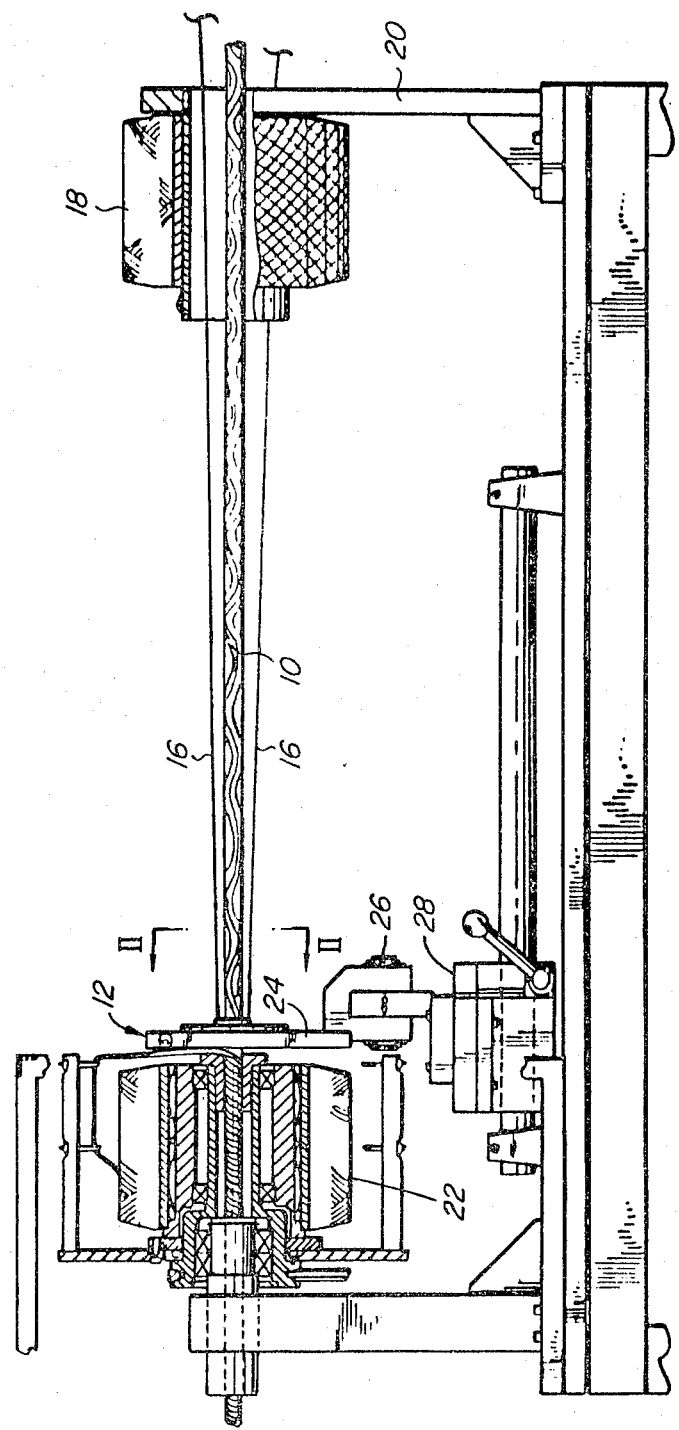
FIG. 1 is a side elevational view of part of apparatus for laying optical waveguides onto a support element.

As shown by FIG. 1, apparatus for laying optical waveguides onto an extruded plastic support filament during optical cable manufacture comprises a laying device 12 disposed in a waveguide laying station along a feed path for the filament.

A set of optical waveguides 16 are fed from an upstream position and through a replacement spool 18 holding binding tape and carried by a replacement spool support means 20. The replacement spool 18 is to replace a spool 22 disposed in the binding station slightly downstream from the laying device 12, when the spool 22 has been used.

Figure 2:
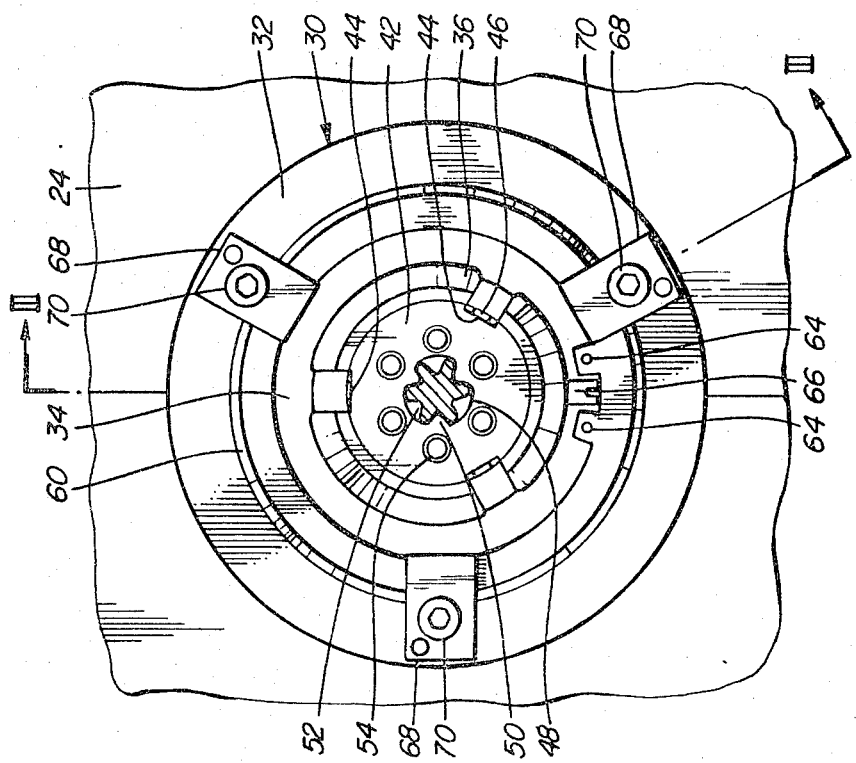
FIG. 2 is a cross-sectional view of part of the apparatus of FIG. 1 taken along lines II—II in FIG. 1 and on a larger scale.

The laying device 12 comprises a holding means comprising two yolks 24 as shown in FIG. 2. These yolks are carried by a supporting structure 26 to a support plateform 28 and are pivotally mounted so as to be moved from a closed position as shown in FIG. 2 to an open position (not shown) in which the replacement spool 18 is movable along the filament 10 into the position occupied by the spool 22 as shown in FIG. 1. This construction, which will not be described further in this specification, is according to the invention described and claimed in U.S. application Ser. No. 208,565 filed Nov. 20, 1980, now U.S. Pat. No. 4,309,866, entitled "Laying and Binding Optical Waveguides Onto A Support Filament" in the name of Miguel Fombollida.

Figure 3:
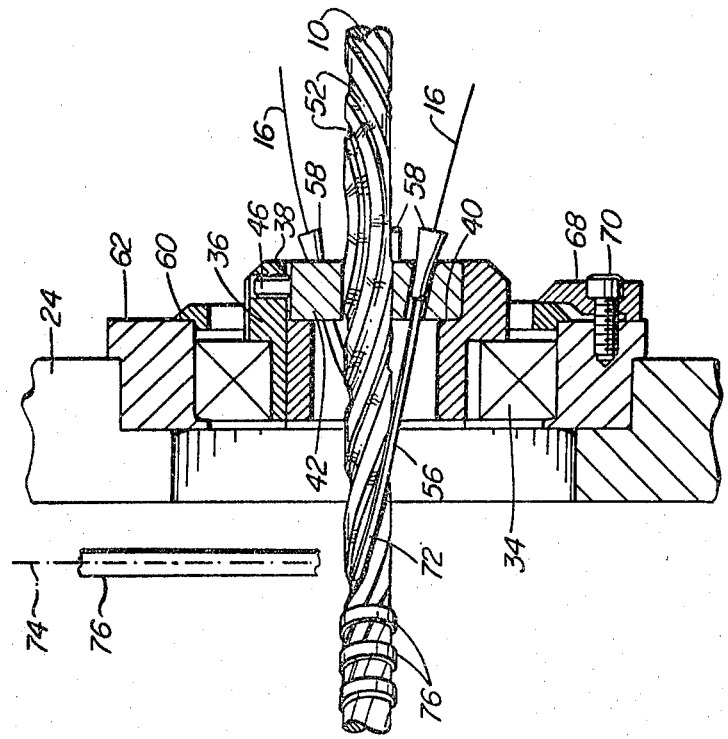
FIG. 3 is a cross-sectional view of the part of the apparatus in FIG. 2 taken along line III—III in FIG. 2 and also showing the support filament being wrapped with binding tape after the waveguides have been laid.

As shown by FIGS. 2 and 3, the yolks 24 of the laying device securely hold a laying unit 30 in the laying station. This unit 30 comprises an annular housing 32 within which is a bearing 34 rotatably mounting a short tube 36 having a large diameter passageway 38 at its upstream end terminating in a radial shoulder 40. This larger diameter passageway houses a die 42 which abuts against the shoulder 40. As shown by FIG. 2, the die 42 is provided with three equally spaced apart flat depressions 44 in its peripheral surface and these depressions are occupied by location pegs 46 screw-fitted radially inwardly through the tube 36. Thus the die is held in position relative to the tube. As shown by FIG. 2, the die has a substantially circular orifice 48, the periphery of which is interrupted by three equally spaced apart groove guide projections 50 which extend inwardly slightly into the orifice. These projections are provided for engagement with alternative grooves 52 formed in sinuous fashion along the support filament 10, as will be described. The die also holds six elongate guide elements for laying waveguides into each of the six grooves of the support filament and, for this purpose, is formed with six equally spaced apart holes 54 which are inclined towards the feed path of the support filament as it passes downstream through the die, as shown in FIG. 3. Each guide element comprises a flexible plastic tube 56 which extends through its associated hole 54 radially inwardly towards the feed path of the support filament as it passes downstream through the die, as shown in FIG. 3. Each guide element comprises a flexible plastic tube 56 which extends through its associated hole 54 radially inwardly towards the feed path of the support filament, the tube being held securely in position within its hole by a rubber sheath 58 closely surrounding the tube and fitting tightly within the hole.

Hence, the tube 36 and die 42 are rotatable together within the housing 32 by means of a bearing 34 unless restrained from doing so. However, it is an important aspect of the invention that the grooves of the support filament as they pass through the laying device are retained in fixed positions around the axis of the filament with respect to any chosen datum. To enable this to be achieved, means is provided to secure the guide projections 50 also in fixed positions with respect to the datum during use of the apparatus. This is achieved by holding the tube 36 and die 42 non-rotatably in the housing. The means for securing the tube and die non-rotatably in position also provides a means to adjust the location of tube and die between one fixed position and another around the axis of the support filament to enable the projections 50 to be located in the median position of movement of the grooves along the filament so as to effect substantially equally twisting of the filament, first in one direction and then the other. This securing and adjusting means comprises a ring 60 which abuts against the upstream end 62 of the housing 30, and comprises two abutment projections 64 which are closely spaced apart so as to accept between them a location peg 66 which extends outwardly from the tube 36 whereby any rotational movement of the tube and die is prevented as shown clearly by FIG. 2. The ring is detachably held in position by three securing clamps 68 which extend inwardly from the surface 62 of the housing and are normally secured thereto by three screws 70. Loosening of the screws and thus of the clamps enables freedom of movement of the ring so that it may be rotated into any position of adjustment in which position the peg 66 is held securely when the screws are retightened.

Finally, on constructional details, as shown by FIG. 3, each tube 56 has a downstream waveguide exit end portion 72 which extends sufficiently far to reach at least to the wrapping station 74 in which binding tape 76 actually contacts the filament 10 from spool 22 as it is wrapped onto the filament. The exit end portions 72 pass beyond the station 74 as shown.

In use of the apparatus, the support filament is fed along the feed path as shown in FIG. 1 and through the die as shown in FIGS. 2 and 3. After passing through the laying device 12, the binding tape 74 from the spool 22 is wrapped around the filament which is already laid with the waveguides in position, and thus the binding tape holds the waveguides in the grooves. As shown by FIG. 3, as the support filament passes through the die 42, the tubes 56 enter into the grooves and guide the waveguides from the tubes into the grooves whereby the waveguides are laid in position. As the support filament passes through the die 42, the three projections 50 engage with three of the grooves 52. As the projections 50 are not rotatable, then the support filament is twisted first in one direction and then the other alternately and this twisting action takes place from the upstream end from its release position from a reel and then to a downstream position beyond the spool 22 at which it is reeled with the waveguides and binding tape in position. Hence, the distance upstream and downstream from the laying device along which the twisting action must take place is relatively long and torque placed upon the support filament is substantially small and may be ignored.

The effect of maintaining the sinuous grooves in fixed positions as they pass through the laying device is that there is no need to rotate the guide elements 56 to feed the waveguides into the grooves and hence the waveguides themselves do not rotate around the support filament as they move from their upstream positions into the die 42. It follows that no problem arises with regard to twisting of the waveguides around the support filament leading to the possibility of the waveguides contacting the filament surface and thereby being drawn into the die with the support filament. Thus once the waveguides are disposed in position for laying into the grooves they are held fixedly in these positions until they actually lie in the sinuous grooves of the support filament. With the above invention, a further problem may be overcome with certain constructions. It is required to accommodate electrical conductors within the grooves of a support filament in addition to the waveguides. In such arrangements it is difficult to locate the electrical conductors in the grooves at the same time as the waveguides. This is because the conductors and waveguides are drawn into the grooves under different conditions of tension and as they oscillate normally during laying around the support filament, it is found that there is a greater risk of the conductors and waveguides contacting each other and being drawn into the die orifice with a support filament than is the case if waveguides are used completely on their own. It is clear that with the present invention and with the above described embodiment, because the oscillating movement of the die 42 is prevented, then where electrical conductors are also being laid into the grooves, then the lack of oscillatory movement does not permit either waveguides or electrical conductors to depart from their preset paths and this problem also cannot arise.

Further, as shown by FIG. 3, the ends 72 of the guide tubes 56 lie completely within the grooves and because of the extended tube position, the binding tape 76 is actually wrapped around the tube exit end portions as well as the filament. Thus as the filament moves downstream, the wrapped tape does not contact the tube end portions but moves axially off them at which point the waveguides emerge from the tubes. Hence, when the waveguides actually move into the grooves away from the tubes 56, the binding tape is already wrapped around the filament and even if any waveguide is tending to move outwards from the groove, it cannot do so at this stage but is held in by the wrapping.

Hence, the invention as shown by the above-described embodiment, clearly improves the procedure for laying in waveguides onto support filament during optical cable manufacture.

What is claimed is:

1. A method of laying optical waveguides into grooves of a support filament wherein the grooves extend sinuously along the support filament comprising:
    passing the filament through a waveguide laying station while holding the filament to retain each of its grooves in substantially the same angular position with respect to a datum around the longitudinal axis of the filament while providing an oscillatory twist in the filament upstream and downstream of the laying station, the degree of twist dependent upon the sinous paths of the grooves, and laying the filaments into the grooves at the laying station.

2. A method according to claim 1, wherein the waveguides are laid into the grooves by passing them along tubular guide elements which extend radially inwardly and axially of a feed path for the support filament, and wrapping the support filament with binding tape in a tape wrapping station which overlaps the waveguide laying station, the binding tape being wrapped around radially inner ends of the guide elements prior to the issue of the waveguides from the guide elements, and the waveguides issuing from the guide elements after the tape has been wrapped around the filament.

3. Apparatus for laying optical waveguides into sinuous grooves of a support filament comprising:
a laying device disposed around the feed path for the support filament, the device comprising:
a plurality of elongate guide elements extending inwardly of the feed path to guide waveguides into the grooves; and
groove guide projections upstream of inner ends of the guide elements, the guide projections secured in fixed positions with respect to a datum around the feed path and extending inwardly to engage within grooves of the filament and hold the grooves in said fixed positions of the guide projections as the filament passes through the laying device.

4. Apparatus according to claim 3, wherein the guide elements are in fixed positions with respect to said datum, inner end portions of the guide elements being flexible.

5. Apparatus according to claim 3, wherein the laying device is annular and has guide projections formed on a ring held stationary surrounding the feed path.

6. Apparatus according to claim 5, wherein the ring also retains the guide elements in fixed positions around the feed path.

7. Apparatus according to claim 3, wherein the guide elements are in fixed positions with respect to said datum.

8. Apparatus according to claim 6, wherein the ring has a radially outwardly projecting means and a surrounding ring means is provided which has stop means for location on each side of the projecting means to prevent rotation of the ring, and means is provided for detachably securing the surrounding ring in position to enable its position around the feed path to be changed.

9. Apparatus according to claim 3, wherein a tape wrapping station is disposed downstream of and overlaps the waveguide laying station, the elongate guide elements being tubular and extending downstream of the feed path to terminate in radially inner ends which lie completely within the grooves, the inner ends extending as far as the tape wrapping station, and in the wrapping station there is provided a tape wrapping means disposed to wrap tape around the support filament and around the inner ends of the guide elements.

10. A method of laying optical waveguides into grooves of a support filament comprising guiding the waveguides into the grooves by passing them along tubular guide elements which extend radially inwardly and axially of a feed path for the support filament, wrapping the support filament with binding tape in a tape wrapping station, the binding tape being wrapped around the filament and radially inner ends of the guide elements which extend along the feed path as far as the wrapping station and lie completely within the grooves, and continued movement of the support filament along the feed path causing the waveguides to issue from the guide elements after the tape has been wrapped around the filament.

11. Apparatus for laying optical waveguides into grooves of a support filament comprising:
a laying device disposed around the feed path of the support filament in a waveguide laying station;
a tape wrapping station disposed downstream of the laying device for wrapping binding tape around the filament, the laying device comprising a plurality of tubular guide elements to guide waveguides into the grooves, the tubular guide elements extending along the feed path and having radially inner ends for waveguide exit disposed downstream of the elements whereby the laying and tape wrapping stations overlap and said inner ends extend into the tape wrapping station; and
in the wrapping station there is provided a tape wrapping means disposed to wrap tape around the support filament and around the inner ends of the guide elements.

* * * * *